Nov. 18, 1958 — A. G. H. DIETZ ET AL — 2,861,021
TRANSPARENT PROTECTIVE SHIELD
Filed Dec. 13, 1956
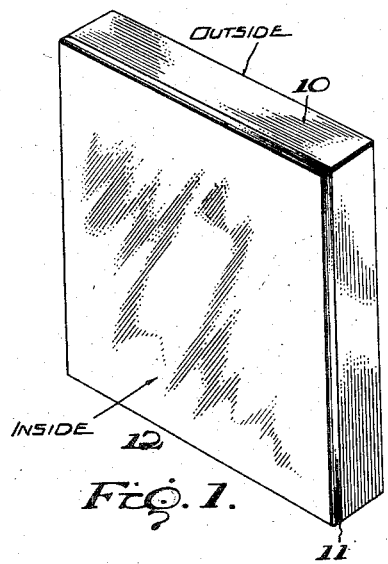
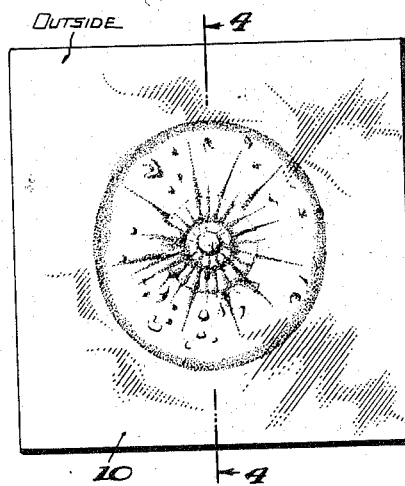
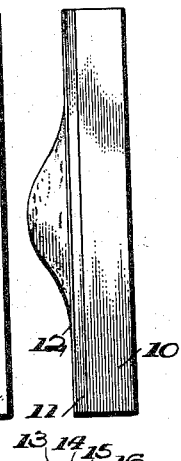
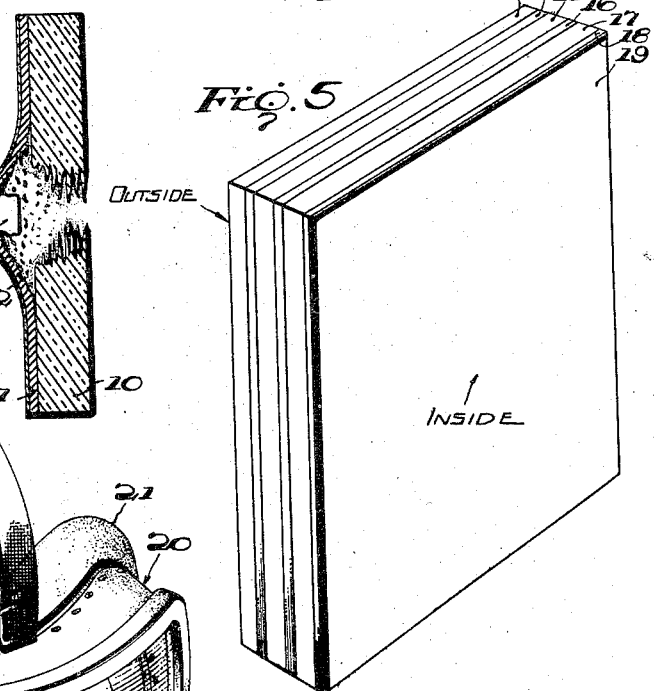
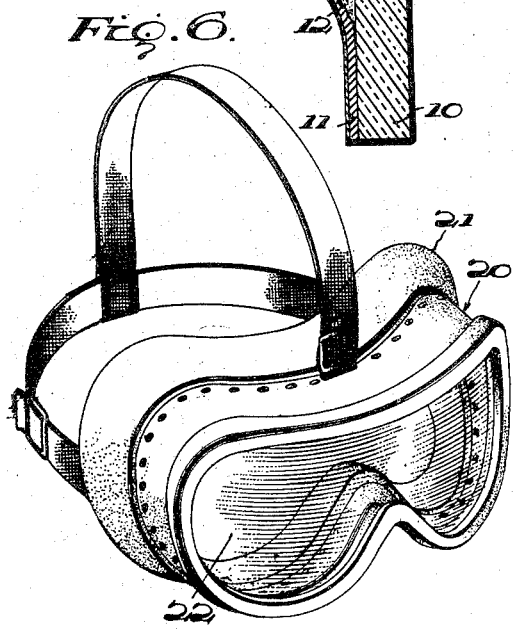
INVENTORS
Albert G. H. Dietz
Fred E. Mooney
BY
ATTORNEY

United States Patent Office 2,861,021
Patented Nov. 18, 1958

2,861,021

TRANSPARENT PROTECTIVE SHIELD

Albert G. H. Dietz, Winchester, and Fred E. Mooney, Harvard, Mass., assignors to the United States of America as represented by the Secretary of the Army Application December 13, 1956, Serial No. 628,209

11 Claims. (Cl. 154—52.5)

This application is a continuation-in-part of our co-pending application Serial Number 2,146, filed January 14, 1948 (now abandoned).

Our invention relates to transparent shatterproof sheet material employed to protect personnel from flying splinters and fragments, particularly for use in eye armor.

Although materials have been developed with generally satisfactory results for such uses as automobile windshields and windows, there is no material known to us which has hitherto proved satisfactory for use in military vehicles, aircraft, or ships where shrapnel and high velocity projectiles are encountered. We do not principally propose a material of armored character, resistant to the passage of the projectiles themselves but are concerned rather mainly with protection against shrapnel as well as the elimination of the flying splinters and fragments ordinarily incident to the passage of the projectile through a transparent window.

We have discovered that a highly successful transparent splinter-proof shield may be constructed of laminated plastic layers of differing characteristics.

Briefly speaking our invention comprises a plurality of laminations of transparent material bonded together to produce an integral sheet in which one or more of the laminations are relatively hard and therefore relatively frangible, while other layers, particularly the inside layer, are composed of relatively tough resilient material. When a mass strikes the outside of the sheet, the hard layers may crack and shatter but in doing so distribute the impact over a relatively wide area so that the impact force per unit area is substantially reduced. On the other hand, the resilient material absorbs the force by converting it into kinetic energy dissipated by the work done to return the material to normal position. In such a sheet it is essential that there be a layer of the resilient material interposed between the person or area to be protected and the innermost layer of the hard frangible material.

The various features of our invention will be more readily understood and appreciated from the following detailed description of two embodiments thereof selected for purposes of illustration and shown by way of example in the accompanying drawing.

In the description which follows we employ the terms "outside" and "inside" and "outer" and "inner" as they would be used in connection with a window, port, or blister set in an airplane or ship.

In the drawing:

Fig. 1 is a perspective view of a preferred transparent protective laminated sheet in accordance with our invention;

Fig. 2 is an elevational front view of the same sheet as it appears after the impact of a projectile such as a small shell fragment;

Fig. 3 is a side elevation corresponding to Fig. 2;

Fig. 4 is a cross sectional view taken along lines 4—4 of Fig. 2;

Fig. 5 is a perspective view of another, but less preferred form of our invention; and Fig. 6 is a perspective view of a goggle embodying a transparent projectile-penetration-resistant sheet in accordance with our invention.

As shown in Fig. 1 of the drawing, we form, in the preferred form of our invention, a projectile- and projectile-fragment-penetration-resistant non-splintering transparent shield, composed of a thick, rigid, shatterable transparent outer layer of polymethyl methacrylate, a material which is relatively hard and frangible; a tough flexible, non-shatterable resistant transparent thin intermediate layer of polyvinyl butyral bonded to the inner surface of the outer polymethyl methacrylate layer, and a very thin high-tensile-strength elongatable transparent innermost layer bonded to the inner surface of the intermediate polyvinyl butyral layer. The outermost first layer 10 of polymethyl methacrylate may be composed of one or more (e. g., two) plies but we presently prefer it to be a single ply as shown in Fig. 1. The intermediate layer 11 of polyvinyl butyral is likewise composed of one or more plies, whose total or aggregate thickness is substantially less than the thickness of outer layer 10; in view of present-day difficulties in securing polyvinyl butyral films of adequate thickness to possess the necessary ballistic properties, we presently prefer to employ a plurality, say about five to seven plies of polyvinyl butyral film laminated to each other to constitute such intermediate layer. The innermost layer 12 is (preferably) a single ply of a transparent high-tensile-strength elongatable plastic substance, such as polyamide film (nylon), polyester film (e. g., polyethylene terephthalate, a substance sold by E. I. duPont de Nemours & Co. under the trademark "Mylar"), or a regenerated cellulose sheet. The several laminations are bonded together to form an integral sheet, preferably by fusing the plastic layers together under elevated temperatures. Alternatively cement may be employed to form the bond, but fusing is preferable. The material may be produced in flat sheets capable of being cut to suitable shapes or the material may be assembled in a mold to form integral curved pieces as for curved lens goggles, aircraft blisters, noses, etc. Conventional molding techniques have been found satisfactory.

In a less preferred embodiment of our invention shown in Fig. 5, the outermost or first layer 13 is composed of polymethyl methacrylate; the next or second layer 14 of polyvinyl butyral; the third layer 15 of polymethyl methacrylate; the fourth layer 16 of polyvinyl butyral; the fifth layer 17 of polymethyl methacrylate; the sixth layer 18 of polyvinyl butyral; and the innermost layer 19 of a polyamide (nylon), polyester (e. g., "Mylar") film or a regenerated cellulose sheet.

A clearer understanding of the invention will be promoted by reference to the action of our sheet in various contingencies, as compared to the action of a sheet of "safety glass" comprising a layer of relatively flexible material sandwiched between two layers of hard frangible material.

If an expanse of a sheet constructed as shown in the drawing is struck by a high velocity projectile such, for example, as a 50 caliber machine gun bullet, the bullet will pass completely through the sheet leaving behind it a through-and-through aperture all of the walls of which are relatively even. Although the outer layer 10 may crack into fragments, the innermost layer 12 will exhibit only a round hole and no fragments, splinters, or spalls will be ejected from the sheet on the inside thereof. In the case of ordinary safety glass, there is extreme likelihood that the innermost layer will shiver and that splinters of glass will fly from the sheet.

If the outermost surface of the sheet shown in the drawing be struck by a relatively large object as by a direct shell hit at low velocity or by a glancing blow at high velocity, the outermost layer 10 will be cracked and broken into fragments over a considerable area, as illustrated in Fig. 2; however, the laminated intermediate polyvinyl butyral layer 11 will yield to the blow and embed the projectile or projectile-fragment P, whose energy has already been dissipated in part by its contact with outer layer 10. Some of the plies of the intermediate layer 11 may or may not be disrupted depending upon the force of the impact. However, the disrupted as well as the undisrupted plies of intermediate layer 11 will also serve to embed any splinters (as shown in Fig. 4) from the shattered area of outer layer 10 and thus prevent them from coming into contact with the face of the wearer, where otherwise it might have inflicted an eye injury of a severity comparable to the injury of that which would have been inflicted by the shell fragment, if no eye-protective device had been worn. The impact stress upon intermediate layer 11 will be in excess of the shattered area of outer layer 10, and thus distribute and dissipate the residual forward momentum of the projectile-fragment. The tough elongatable innermost layer 12 serves to back up the intermediate layer 11 and to confine the inward bulge (see Fig. 3) created by the impact of the fragment to a moderate depth so as to avoid a blow against the face of the wearer. The innermost layer 12 also serves the subsidiary purpose of protecting the device against scratches and embedding of dust and other foreign particles, which otherwise would tend to accumulate on the inside of the shield because of the somewhat tacky nature of polyvinyl butyral, especially in a hot climate.

As is the case in all items of body armor, an effective compromise must be struck in the eye armor of the present invention between thickness and ballistic protection. In other words, a very thick shield though possessed of great protective capacity, would render the goggle in which it is incorporated so heavy that the wearer will not be able to use it effectively in combat. We have found that a protective eye armor shield in accordance with the above-explained principles of our invention, may be composed of an outer layer of polymethyl methacrylate having a thickness of about .3–.5 in., an intermediate (preferably multi-ply) layer of polyvinyl butyral of an aggregate thickness of about .05 to .12 in., and a (preferably single-ply) innermost layer of nylon, polyester or regenerated cellulose film of a "thickness" from about .001 to about .01 in. In the actual embodiments illustrated in Figs. 1–4, the outer polymethyl methacrylate single-ply layer has a thickness of .375±.045 in. (the variation being due to the manufacturer's factory tolerance), the five plies of the intermediate polyvinyl butyral layer have an aggregate thickness of about .075±.015 in. (corresponding to an average thickness of .015±.003 in. for each individual ply), and the innermost layer 14 has a "thickness" of about .003±.002 in. This sheet was found to have a protective limit of 1510 ft./sec., i. e., was capable of stopping 50% of the fragments delivered by a 17-grain fragmentation bullet traveling 1510 ft./sec. at the instant of impact. The protection is comparable to the protection afforded by the standard Army Armored Vest, and is presently sufficient for combat conditions; e. g., against most hand grenade, mortar and anti-aircraft shell fragments, mine fragments, and against pistol or submachine-gun bullets, although not against .30 cal. rifle bullets and machine-gun bullets unless ricochetting or nearly spent.

In the embodiment of our invention illustrated in Fig. 5, the individual layers of polymethyl methacrylate 13, 15 and 17 are of lesser thickness than that of the single-ply polymethyl methacrylate layer of the embodiments of Figs. 1–4 thereof, e.g., of a thickness of about .25 in. or less each. The intermediate layers of polyvinyl butyral 14, 16 and 18 are of about the same thickness as in the principal embodiment, i. e., about .05–.12 in. each, each individual layer being preferably composed of from about five to seven plies of an individual "thickness" of about .015 in. each. The innermost layer 19 of nylon, polyester or regenerated cellulose may likewise have a thickness of .003±.002 in. as in the principal embodiment. The principle of operation of the embodiment of Fig. 5 is substantially analogous to the principal embodiment of Figs. 1–4, except that the splintering of successive polymethyl methacrylate layers 13, 15, and 17 will be progressively less upon impact by a projectile or projectile-fragment. The protective ballistic limit of the embodiments of Fig. 5 is substantially the same as the embodiment of Figs. 1–4; however, it suffers from the disadvantage that it is difficult to curve, as on curving of the laminated sheet, the polyvinyl butyral layers 14, 16 and 18 tend to creep, with consequent lack of uniformity in the aggregate thickness of the polyvinyl butyral layers, which reduces the uniform protective qualities of the curved eye shield.

As shown in Fig. 6 of the drawing, a protective eye shield in accordance with our invention may be incorporated, e. g., in a conventional goggle resembling an aviator's goggle 20, having a protective face piece 21 of sponge rubber or analogous material in order to soften the thrust exerted by a projectile or projectile-fragment when it strikes the eye shield 22. As shown in Fig. 6, eye shield 22 is preferably slightly curved for better vision; this is a desirable, but not an indispensable feature of our invention.

While changes in the arrangement, proportions, dimensions and shape of the protective eye shield and component parts thereof, disclosed in this specification will readily occurs to the expert without departing from the spirit of the invention, it is our desire to encompass such variations within the scope of such invention; we thus desire to be limited only by the appended claims.

We claim:

1. A projectile- and projectile-fragment-penetration-resistant non-splintering transparent shield, comprising a thick, rigid, shatterable transparent outer layer of polymethyl methacrylate, said outer layer having a thickness from about .25 to about .5 in., a tough, flexible, non-shatterable resilient transparent thin intermediate layer of polyvinyl butyral bonded to the inner surface of said outer layer, said intermediate layer having a thickness of at least about .05 in. and being thinner than said outer layer, and a thin high-tensile-strength elongatable transparent inner layer bonded to the inner surface of said intermediate layer, said inner layer being of a thickness of at least about .001 in. and having lesser thickness and a harder surface than said polyvinyl butyral intermediate layer, and said inner layer being a member of the group consisting of polyamide, polyester and regenerated cellulose; whereby when said outer layer is shattered by a projectile or projectile-fragment, the splinters of said outer layer are embedded in said intermediate layer backed by said inner layer, and said projectile or projectile-fragment is stopped before penetrating said inner layer.

2. A projectile- and projectile-fragment-penetration-resistant non-splintering transparent shield, comprising a thick, rigid, shatterable transparent outer layer of polymethyl methacrylate, said outer layer having a thickness from about .25 to about .5 in., a tough, flexible, non-shatterable resilient transparent thin intermediate layer of polyvinyl butyral bonded to the inner surface of said outer layer, said intermediate layer having a thickness of at least about .05 in. and being thinner than said outer layer, and a thin high-tensile-strength elongatable transparent inner regenerated cellulose layer bonded to the inner surface of said intermediate layer, said inner layer being of a thickness of at least about .001 in. and having lesser thickness and a harder surface than said polyvinyl butyral intermediate layer; whereby when said outer layer is shattered by a projectile or projectile-fragment, the splinters of said outer layer are embedded in said intermediate layer backed by said inner layer, and said projectile or projectile-fragment is stopped before penetrating said inner layer.

3. A projectile- and projectile-fragment-penetration-resistant non-splintering transparent shield, comprising a thick, rigid, shatterable transparent outer layer of polymethyl methacrylate, said outer layer having a thickness from about .25 to about .5 in. a tough, flexible, non-shatterable resilient transparent thin intermediate layer of polyvinyl butyral bonded to the inner surface of said outer layer, said intermediate layer having a thickness of at least about .05 in. and being thinner than said outer layer, and a thin high-tensile-strength elongatable transparent inner polyamide layer bonded to the inner surface of said intermediate layer, said inner layer being of a thickness of at least about .001 in. and having lesser thickness and a harder surface than said polyvinyl butyral intermediate layer; whereby when said outer layer is shattered by a projectile or projectile-fragment, the splinters of said outer layer are embedded in said intermediate layer backed by said inner layer, and said projectile or projectile-fragment is stopped before penetrating said inner layer.

4. A projectile- and projectile-fragment-penetration-resistant non-splintering transparent shield, comprising a thick, rigid, shatterable transparent outer layer of polymethyl methacrylate, said outer layer having a thickness from about .25 to about .5 in. a tough, flexible, non-shatterable resilient transparent thin intermediate layer of polyvinyl butyral bonded to the inner surface of said outer layer, said intermediate layer having a thickness of at least about .05 in. and being thinner than said outer layer, and a thin high-tensile-strength elongatable transparent inner polyester layer bonded to the inner surface of said intermediate layer, said inner layer being of a thickness of at least about .001 in. and having a harder surface than said polyvinyl butyral, whereby when said outer layer is shattered by a projectile or projectile-fragment, the splinters of said outer layer are embedded in said intermediate layer backed by said inner layer, and said projectile or projectile-fragment is stopped before penetrating said inner layer.

5. A projectile- and projectile-fragment-penetration-resistant non-splintering transparent shield according to claim 1, wherein at least one of said outer and intermediate layers consist of a plurality of plies.

6. A projectile- and projectile-fragment-penetration-resistant non-splintering transparent shield, comprising a thick, rigid, shatterable transparent outer layer of polymethyl methacrylate, said outer layer being a single ply of a thickness from about .3 to about .5 in., a tough, flexible, non-shatterable resilient transparent thin intermediate layer of polyvinyl butyral bonded to the inner surface of said outer layer, said intermediate layer having a thickness of at least about .05 in., and being thinner than said outer layer and a thin high-tensile-strength elongatable transparent inner layer bonded to the inner surface of said intermediate layer, said inner layer being of a thickness of at least about .001 in. and having lesser thickness and a harder surface than said polyvinyl butyral intermediate layer, and said inner layer being a member of the group consisting of polyamide, polyester and regenerated cellulose; whereby when said outer layer is shattered by a projectile or projectile-fragment, the splinters of said outer layer are embedded in said intermediate layer backed by said inner layer, and said projectile or projectile-fragment is stopped before penetrating said inner layer.

7. A projectile- and projectile-fragment-penetration-resistant non-splintering transparent shield, according to claim 6, wherein said intermediate layer of polyvinyl butyral consists of a plurality of plies whose aggregate thickness is substantially less than the thickness of said outer layer.

8. A projectile- and projectile-fragment-penetration-resistant non-splintering transparent shield according to claim 7, wherein there are about five plies in said intermediate layer.

9. A projectile- and projectile-fragment-penetration-resistant non-splintering transparent eye shield according to claim 1, wherein the thickness of said outer layer of polymethyl methacrylate is from about .3 to about .5 in., the thickness of said intermediate layer of polyvinyl butyral is from about .05 to about .12 in., and the thickness of said inner layer is from about .001 to about .01 in.

10. A projectile- and projectile-fragment-penetration-resistant non-splintering transparent eye shield according to claim 1, wherein the thickness of said outer layer of polymethyl methacrylate is about $.375 \pm .045$ in., the thickness of said intermediate layer of polyvinyl butyral is about $.075 \pm .015$ in., and the thickness of said inner layer is about $.003 \pm .002$ in.

11. A projectile- and projectile-fragment-penetration-resistant non-splintering transparent shield comprising a plurality of alternating laminated strata of thick, rigid, shatterable transparent layers of polymethyl methacrylate, each of said polymethyl methacrylate layers having a thickness of about .25 in., and tough, flexible, non-shatterable resilient transparent thin layers of polyvinyl butyral, each of said polyvinyl butyral layers having a thickness from about .05 to about .12 in., and a thin high-tensile-strength elongatable transparent innermost layer bonded to the inner surface of the last polyvinyl butyral layer, said innermost layer being of a thickness of at least about .001 in. and having lesser thickness than and a harder surface than any of said polyvinyl butyral layers, and said innermost layer being a member of the group consisting of polyamide, polyester and regenerated cellulose; whereby when said polymethyl methacrylate layers are shattered by a projectile or projectile-fragment, the splinters of said polymethyl methacrylate layers are embedded in said polyvinyl butyral layers, and said projectile or projectile-fragment is stopped before penetrating said inner layer.

References Cited in the file of this patent

UNITED STATES PATENTS

| | | |
|---|---|---|
| 2,387,227 | Andersen et al. | Oct. 23, 1945 |
| 2,417,383 | Switzer | Mar. 11, 1947 |
| 2,417,837 | Paggi | Mar. 25, 1947 |
| 2,418,018 | Ernsberger et al. | Mar. 25, 1947 |
| 2,456,467 | Swedlow | Dec. 14, 1948 |
| 2,464,826 | Neher et al. | Mar. 22, 1949 |